Patented Apr. 8, 1941

2,237,296

UNITED STATES PATENT OFFICE 2,237,296

MANUFACTURE OF SUBSTITUTED AMIDES

Alfred William Baldwin, Henry Alfred Piggott, and Francis Sydney Statham, Blackley, Manchester, England, assignors to Imperial Chemical Industries Limited, a corporation of Great Britain No Drawing. Application December 14, 1938, Serial No. 245,768. In Great Britain December 28, 1937

3 Claims. (Cl. 260—404)

This invention relates to the manufacture of substituted acid amides.

It is an object of the invention to provide a new and easily worked process for the manufacture of amidomethylphenols and amidomethylphenol ethers. It is a further object to provide a process for the manufacture of compounds useful as intermediates for the preparation of assistants to be used in the textile and leather treating industries.

According to the invention we manufacture amidomethylphenols or amidomethylphenol ethers of the general formula:

RCONH—CH$_2$—Ar—O—R' wherein R is an aliphatic (including cycloaliphatic) radical of at least eight carbon atoms, R' is hydrogen or a hydrocarbon radical of the aliphatic (including cycloaliphatic), aliphatic-aromatic, or aromatic series which may carry substituents, for example, halogen atoms, hydroxy or alkoxy groups, and Ar is an aromatic radical of the benzene or naphthalene series which may carry substituents (other than sulphonic acid groups) additional to those shown, for example halogen atoms, alkyl, alkoxy, hydroxy or ester groups, by causing a suitable phenol or phenol ether to react, in the presence of an acidic condensing agent, with formaldehyde (or a formaldehyde-yielding substance) and an amide of the formula RCONH$_2$ (R having the meaning given above).

The term "suitable" as used above is intended merely to indicate that the phenol or phenol ether to be used must have such a structure that the amidomethylphenol or amidomethylphenol ether made therefrom conforms to the general formula given above.

As phenols or phenol ethers, there may be used phenols containing one or more hydroxyl groups or the ethers of such phenols, such as, for example, phenol, resorcinol, technical mixture of cresols, o-chlorophenol, methyl salicylate, β-naphthol, anisole, phenetole, methyl ether of technical cresols, resorcinol dimethyl ether, diphenyl ether, benzylphenyl ether, methyl phenoxyacetate, tolyl methyl ether and β-toloxyethyl chloride (wherein the toloxy radical corresponds to that obtained from a technical mixture of cresols).

As amides of the formula RCONH$_2$, wherein R is an aliphatic (including cycloaliphatic) radical of at least eight carbon atoms there may be used, for example, lauramide, myristamide, palmitamide, stearamide, oleamide and the amide prepared from coconut oil fatty acids. It is of course understood that these amides may be substantially pure substances or that they may be mixtures, such as are obtained from commercially available raw materials.

As formaldehyde-yielding substances it is preferred to use paraformaldehyde, but there may also be used, for example, hexamethylene tetramine or aldehyde-bisulphite compounds.

As condensing agents there may be used, for example, acids, such as sulphuric acid or hydrochloric acid, or acid-reacting substances such as zinc chloride or aluminium chloride.

In carrying the invention into practical effect the reactants and the condensing agents are mixed and stirred together at ordinary or preferably at a moderately elevated temperature for a few hours. In most cases it is convenient to use an excess of the phenol or phenol ether since many of these compounds are volatile in steam and the excess can thus be readily eliminated in the subsequent working up; an excess of amide could not be so easily removed.

If desired, the reaction may be carried out in the presence of a diluent or solvent, for example, an excess of the phenol or phenol ether may provide a solvent in which the reaction may take place. Alternatively, other solvents or diluents may be added, for example ethyl alcohol, glacial acetic acid, benzene and ethylene dichloride.

The reaction products may be purified and isolated by the methods familiar in the art.

According to the preferred conditions for carrying the invention into practical effect, the reactants are heated together at a temperature not greater than 100° C., the reaction mass is poured into water, any excess of the phenol or phenol ether is removed by steam distillation, and the product which separates on cooling is washed with water, collected and dried. If desired, the product is purified by crystallizing, for example, from methanol.

The products of the invention are useful as intermediates for the preparation of scouring, lathering, wetting out, foaming, cleansing, lime-soap dispersing, emulsifying and penetrating agents for the treatment of textiles, leather and the like.

The invention is illustrated but not limited by the following example, in which the parts are by weight.

*Example*

28 parts of stearamide, 6 parts of paraformaldehyde, 60 parts of anisole and 30 parts of anhydrous zinc chloride are mixed and stirred together at a temperature of 70° C. for 3 hours. The mixture is then poured into water and the excess of anisole removed by steam distillation. The stearomethoxybenzylamide, which separates in the form of a white solid, is filtered off and freed from zinc chloride by washing with water. If desired, the product may be further purified by crystallizing from methanol. It then has M. P. 105–107° C.

As many apparently widely different embodiments of this invention may be made without departing from the spirit and scope thereof, it is to be understood that the invention is not limited to the specific embodiments thereof except as defined in the appended claims.

We claim:

1. A process for the manufacture of amides having the general formula

RCONH—CH₂—Ar—O—R' wherein R stands for an aliphatic radical containing at least 8 carbon atoms, Ar represents an aromatic radical of the benzene and naphthalene series, and R' is a member of the group consisting of hydrogen, alkyl radicals, and aromatic hydrocarbon radicals, which comprises causing a compound selected from the group consisting of phenols and phenol ethers to react in the presence of an acidic condensing agent with a substance selected from the group consisting of formaldehyde and formaldehyde-yielding substances and an amide having the formula

RCONH₂ wherein R stands for an aliphatic radical containing at least 8 carbon atoms.

2. A process for the manufacture of amides having the general formula

RCONH—CH₂—Ar—O—R' wherein R stands for a straight chain aliphatic hydrocarbon radical containing from 11 to 17 carbon atoms, Ar represents an aromatic radical of the benzene series, and R' is an alkyl radical, which comprises causing a phenol ether to react in the presence of an acidic condensing agent with a formaldehyde-yielding substance an an amide having the formula

RCONH₂ wherein R stands for a straight chain aliphatic hydrocarbon radical containing from 11 to 17 carbon atoms.

3. A process for the manufacture of stearomethoxybenzylamide which comprises causing anisole to react with paraformaldehyde and stearamide in the presence of zinc chloride.

ALFRED WILLIAM BALDWIN.
HENRY ALFRED PIGGOTT.
FRANCIS SYDNEY STATHAM.